US00RE40921E

(19) United States
(12) Reissued Patent
Wu et al.

(10) Patent Number: US RE40,921 E
(45) Date of Reissued Patent: Sep. 22, 2009

(54) MECHANISM FOR EFFICIENTLY PROCESSING DEFERRED ORDER-DEPENDENT MEMORY ACCESS TRANSACTIONS IN A PIPELINED SYSTEM

(75) Inventors: William S. Wu, Cupertino, CA (US); Peter D. MacWilliams, Aloha, OR (US); Stephen Pawlowski, Beaverton, OR (US); Muthurajan Jayakumar, Sunnyvale, CA (US)

(73) Assignee: Intel Corporation, Santa Clara, CA (US)

(21) Appl. No.: 09/972,704

(22) Filed: Oct. 4, 2001

Related U.S. Patent Documents

Reissue of:

(64) Patent No.: 5,961,621
Issued: Oct. 5, 1999
Appl. No.: 08/827,540
Filed: Mar. 28, 1997

(51) Int. Cl.
*G06F 13/00* (2006.01)

(52) U.S. Cl. ..... 710/107; 711/140; 711/146; 711/169; 711/100; 710/100

(58) Field of Classification Search ..... None
See application file for complete search history.

(56) References Cited

U.S. PATENT DOCUMENTS 5,682,516 A * 10/1997 Sarangdhar et al. ..... 395/473
5,761,444 A * 6/1998 Ajanovic et al. ..... 395/292
5,774,700 A * 6/1998 Fisch et al. ..... 395/555
5,778,438 A * 7/1998 Merchant ..... 711/146

OTHER PUBLICATIONS

Pentinum Pro Family Developer's Manual Volume: Specifications, Chapters 4–5, Dec. 1996.*

* cited by examiner

*Primary Examiner*—Kevin L Ellis
(74) *Attorney, Agent, or Firm*—Blakely, Sokoloff, Taylor & Zafman LLP

(57) ABSTRACT

A bus agent defers an ordered transaction if the transaction cannot be completed in order. When an ordered transaction is deferred, its visibility for the next ordered transaction is asserted if it can guarantee a sequential order of the ordered transaction and the next ordered transaction. This visibility indication allows the bus agent to proceed with the next ordered transaction without waiting for the completion status of the deferred transaction. The visibility indication provides fast processing of ordered transactions.

28 Claims, 4 Drawing Sheets

| SNOOP RESULT | COMPLETE | NEXT ORERED | HIT# | HITM# | DEFER# | VSBL# |
|---|---|---|---|---|---|---|
| CLEAN | YES | ALLOWED | INACTIVE | INACTIVE | INACTIVE | X |
| SHARED | YES | ALLOWED | ACTIVE | INACTIVE | INACTIVE | X |
| MODIFIED | YES | ALLOWED | INACTIVE | ACTIVE | X | X |
| STALL | NO | WAIT | ACTIVE | ACTIVE | X | X |
| DEFERERD | NO | WAIT | X | INACTIVE | ACTIVE | INACTIVE |
| | NO | ALLOWED | X | INACTIVE | ACTIVE | ACTIVE |

FIG. 2

MECHANISM FOR EFFICIENTLY PROCESSING DEFERRED ORDER-DEPENDENT MEMORY ACCESS TRANSACTIONS IN A PIPELINED SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the field of pipelining memory accesses. In particular, the invention is related to pipelining ordered memory accesses.

2. Description of Related Art

As processor performance continues to outpace memory performance, reducing the latency in memory accesses is critical in achieving high performance in today's computer systems. One method to reduce this latency is pipelining. Pipelining is a mechanism in which several stages or phases in the processing of instructions are carried out in an overlapped or parallel manner such that overall instruction throughput is optimized.

In a typical prior art architecture, a bus activity is hierarchically organized into operations, transactions, and phases. An operation is a bus procedure that appears atomic to software even though it may not be atomic on the bus. A transaction is the set of bus activities related to a single bus request. A transaction may contain up to six phases. A phase uses a specific set of signals to communicate a particular type of information. The six phases of the prior art processor bus protocol are: arbitration, request, error, snoop, response, and data.

In the arbitration phase, a bus agent which is not the current bus owner requests the bus. In the request phase, the bus owner drives request and address information on the bus. In the error phase, any parity errors triggered by the request are reported. In the snoop phase, the address information is determined if it references a valid or modified (dirty) cache line. In addition, the snoop results also indicate whether a transaction will be completed in-order or may be deferred for possible out-of-order completion. In the response phase, the status of the transaction is reported (whether failure or success, whether completion is immediate or deferred, etc.). The data phase is needed when the bus agent requests a data transfer such as read or write.

Instructions are typically executed in order, i.e., in the same order that they are originally written. Therefore, the transactions initiated by the instructions are required to be ordered. If, for some reason, the transaction cannot be performed immediately, then it has to be deferred. There is a signal asserted by the system to inform the processor that the transaction has been deferred so that the processor is prevented from issuing further order-dependent transactions. Because the deferred transaction takes some time to be completed, the processor has to wait until it receives a signal stating the status of the deferred transaction before it can issue the next order-dependent transactions. This waiting time imposes a penalty to the overall system throughput, especially in high performance system.

It is, therefore, desirable to have a mechanism that allows the processor to continue issuing in-order transactions without waiting for the status of the deferred transactions.

SUMMARY OF THE INVENTION

The present invention describes a method and a system for efficient pipelining ordered memory accesses which includes transactions to be processed in order A transaction is deferred if it cannot be completed in order. A visibility signal is provided if a sequential order of the deferred transaction and the next ordered transaction is guaranteed.

BRIEF DESCRIPTION OF THE DRAWINGS

The features and advantages of the present invention will become apparent from the following detailed description of the present invention in which:

FIG. 2 is a table showing the various encodings of the snoop signals HIT#, HITM#, DEFER#, and VSBL#.

DESCRIPTION OF THE PRESENT INVENTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

In the following description, conventional signal names and symbols are used. For example, the symbol "#" represents an active low signal. In addition, the following definitions are relevant:

Agent: Any device that connects to the processor bus including the processors themselves. The term agent used here refers to "bus agent". There are several classifications of bus agents: central agent, input/ output (I/O) agent, and memory agent. A central agent is one that handles reset, hardware configuration and initialization, special transactions, and centralized hardware error detection and handling. An I/O agent is one that interfaces to I/O devices using I/O port addresses; it can be a bus bridge to another bus used for I/O devices, such as a PCI bridge. A memory agent is one that provides access to main memory.

In-order execution: A type of execution that executes the transactions in the same order as they were issued.

Out-of-order execution: A type of execution that enables the processor to execute an instruction even if previous instructions in the execution stream have not completed or executed.

Speculative execution: A type of execution that enables the processor to execute an instruction that may or may not be part of the execution stream (such as an instruction following a conditional branch), so long as the processor can undo the instruction's effect if it is not part of the execution stream.

The present invention discloses a method and apparatus for efficient pipelining of ordered memory accesses on a parallel bus. Memory access transactions on a parallel bus can be deferred using a defer signal. A visibility guarantee signal is employed to indicate that a deferred transaction will not be retried and will be sequentially consistent in all subsequent transactions. The processor then can initiate the next ordered transaction without waiting for the report of the completion of the deferred transaction, resulting in fast overall throughput.

Figure 1:
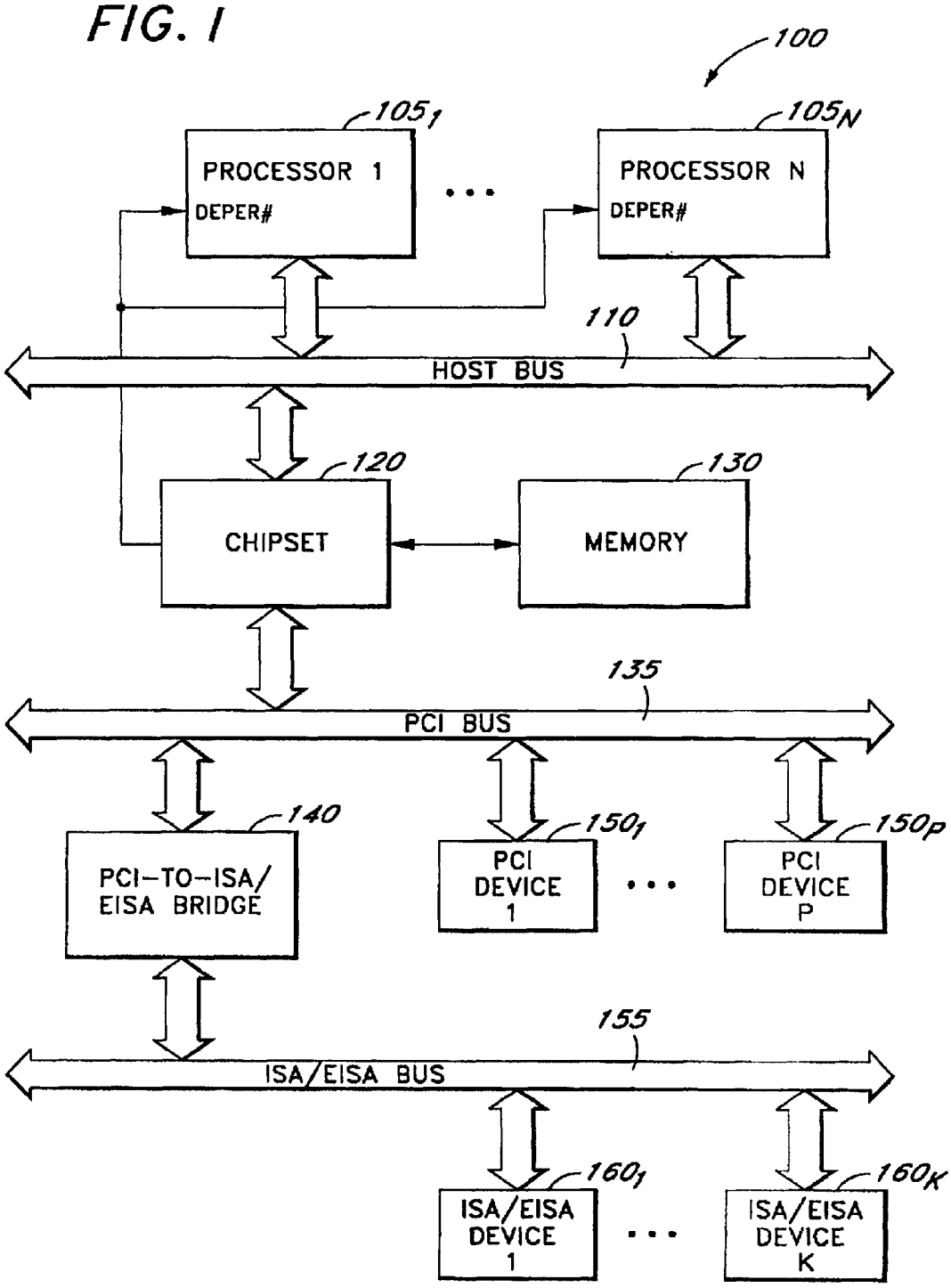
FIG. 1 is a block diagram illustration of one embodiment of a system that operates in accordance with the teachings of the present invention.

Referring to FIG. 1, an illustrative embodiment of a computer system utilizing the present invention is shown. The computer system 100 comprises a number of processors $\mathbf{105}_1$–$\mathbf{105}_N$ ("N" being a positive whole number) and a main memory element 130 (e.g., dynamic random access memory "DRAM", static random access memory "SRAM" etc.) coupled together by a chipset 120. The chipset 120 operates as an interface between a plurality of buses, namely a host bus 110, a peripheral bus 135 and an expansion bus 155.

Processors $\mathbf{105}_1$–$\mathbf{105}_N$ are any microprocessors. In this embodiment, processors $\mathbf{105}_1$–$\mathbf{105}_N$ are the Pentium® or Pentium® Pro™ microprocessors manufactured by Intel Corporation at Santa Clara, Calif.

Chipset 120 typically includes cache DRAM controller ("CDC"), peripheral bus (e.g., PCI) controller, and data path unit ("DPU"). The PCI Bridge ("PB") provides a set of host-to-PCI and PCI-to-host bus transaction translations The host bus 110 is a bus that can support transactions to a number of connected processors. Host 110 may be referred to as a parallel bus or multiprocessor bus because it supports parallel operations and multiple processors. It is contemplated that host bus 110 operates in a pipelined manner to increase efficiency. However, these features are not construed to limit the teachings of the present invention. The present invention can be utilized if there is only one processor connected to the host bus 110.

The peripheral bus 135 provides a communication path between the processors $\mathbf{105}_1$–$\mathbf{105}_N$ or main memory element 130 and a plurality of peripheral devices $\mathbf{150}_1$–$\mathbf{150}_p$ ("p" being a positive whole number). These peripheral devices $\mathbf{150}_1$–$\mathbf{150}_p$ may include I/O devices such as disk controller, data entry interface circuits, and pointing device controllers. The peripheral bus 135 may include a Peripheral Component Interconnect ("PCI") bus or any other type of bus architecture.

The expansion bus 155 provides a communication path between the peripheral bus 135 and a plurality of expansion peripheral devices $\mathbf{160}_1$–$\mathbf{160}_K$ ("K" being a positive whole number). The expansion bus 155 may include an Industry Standard Architecture ("ISA") bus or an Extended Industry Standard Architecture ("EISA") bus.

Signals on Host Bus 110:

Bus activity is hierarchically organized into transactions and phases. A transaction is comprised of multiple phases. Most phases occur in order. The host bus 110 pipelines transaction in which bus transactions in different phases overlap.

One embodiment of the present invention explicitly defines a Deferred phase. A transaction enters the Deferred phase or a Deferred Reply transaction if it has been deferred in the Snoop and Response phases and the transaction is ready for completion. A Data phase is possible. The agent responsible for the Deferred phase or the Deferred Reply transaction is usually the responding agent and is referred to as the deferring agent. After completion of the Deferred phase or the Deferred Reply transaction, the transaction has been completed successfully.

Each phase typically has some associated signals that have special meanings. In the present invention, the Snoop phase and the Deferred phase or the Deferred Reply transaction are the most relevant.

The snoop signal group includes the following signals: HIT#, HITM#, DEFER#, VSBL#. These signals provide snoop result information and transaction completion information to the host bus agents in the Snoop Phase. These signals are typically generated by the chipset and are available on the host bus. The significance of these signals is explained below.

HIT# is the Cache Hit signal. It is used by the requesting agent to determine the permissible cache state of the line. The HIT# signal is also used in conjunction with the HITM# signal to indicate whether a bus agent requires a snoop phase stall.

HITM# is the Hit Modified signal. It is used to indicate whether the transaction hits a modified cache line so that the snooping agent performs an implicit write back to update the main memory. The HITM# signal is also used in conjunction with the HIT# signal to indicate whether a bus agent requires a snoop phase stall.

DEFER# is the Defer signal. It is used to indicate whether the transaction will be committed for completion immediately or if the commitment is deferred.

VSBL# is the Guaranteed Visibility signal. It may be asserted with the DEFER# signal by the deferring agent to indicate that visibility of the transaction is guaranteed for future transactions even though the transaction completion is deferred.

The visibility of the transaction indicates that the transaction is completed as seen by other transactions. An understanding of the concept of visibility is important to appreciate the role of the VSBL# signal. To illustrate this concept, an example of a system having two processors, P1 and P2, is now given. A read to address A by processor P1 is considered visible from the point of view of processor P2 if a write to A issued by P2 cannot change the value read by P1. A write to A by P1 is considered visible from the point of view of P2 if a read to A issued by P2 cannot return the value of A prior to the write by P1.

The chipset asserts VSBL# when it can guarantee the sequential order of transactions. This early indication of visibility allows the requesting agent to start future ordered transactions, since the deferred transaction is considered complete by software.

Deferred phase or Deferred Reply transaction signals are used by a deferring agent to complete a previously deferred transaction. The defer signal group includes the following signals: IDS# and ID [7:0]#. The assertion of IDS# defines the beginning of the deferred phase. The identification (ID) of the deferred transaction is contained in the ID [7:0]# signals.

In the present invention, if visibility of a deferred transaction is guaranteed, i.e., VSBL# is asserted, the Request phase for the next ordered transaction may begin. Without the visibility indication, the Request phase for the next ordered transaction may not begin until the completion of the Deferred phase or the Deferred Reply Transaction.

Snoop Results:

On observing a Request Phase for a memory access, all caching agents are required to perform an internal snoop operation and appropriately return HIT# and HITM# in the Snoop Phase. The results of combinations of HIT#, HITM#, DEFER#, and VSBL# signal encodings during a valid Snoop Phase is shown in FIG. 2.

Referring to FIG. 2, the results of the Snoop Phase include the following:

CLEAN: This result indicates that the cache line will be invalid in the caches of all other agents on the host bus. The requesting agent can store the line in any state (Modified, Exclusive, Shared, or Invalid). This result is produced by HIT# inactive, HITM# inactive, and DEFER# inactive, regardless of the state of VSBL#. The transaction is complete and the next ordered transaction is allowed.

SHARED: This result indicates that the cache line will remain valid in the cache of an agent on the host bus. The requesting agent can store the cache line in some states (Shared or Invalid). This result is produced by HIT# active, HITM# inactive, and DEFER# inactive, regardless of the state of VSBL#. The transaction is complete and the next ordered transaction is allowed.

MODIFIED: This result indicates that the cache line is in the modified state in an agent on the host bus. This result is produced by HIT# inactive and HITM# active, regardless of the state of DEFER# and VSBL#. The transaction is complete and the next ordered transaction is allowed.

STALL: This result indicates that an agent on the host bus is not yet ready to provide a snoop result. The Snoop Phase will be stalled for some additional clocks. Any agent on the bus may use the STALL state on any transaction as a stall mechanism. This result is produced by HIT# active and HITM# active, regardless of the state of DEFER# and VSBL#. The transaction is not complete and the next ordered transaction has to wait.

DEFERRED: This result indicates that the requesting agent will not complete the transaction or make final cache state transition. This result is produced by HITM# inactive and DEFER# active, further qualified by VSBL#, regardless of the state of HIT#. The transaction is not complete. If VSBL# is inactive (while HITM# is inactive and DEFER# is active) the next ordered transaction has to wait to be issued. If VSBL# is active (while HITM# is inactive and DEFER# is active) the next ordered transaction is allowed to be issued.

The VSBL# signal, when asserted, provides an early indication that the transaction can be complete in order so that the requesting agent can start the next ordered transaction. By overlapping the preparation of the next ordered transaction and the deferred delay time, the overall throughput can be improved. If VSBL# is deasserted, the requesting agent should not issue any future order-dependent transactions until the deferred transaction is successfully completed.

Memory accesses on the host bus may be non-cacheable or cacheable. The VSBL# signal provides early indication of transaction completion in both non-cacheable and cacheable accesses.

Non-cacheable Accesses:

For non-cacheable accesses, the assertion of the VSBL# signal allows pipelining of reads and writes in the system. In systems with interconnect/ multiple paths where write transactions are typically deferred, the assertion of VSBL# guaranteeing visibility improves the overall system bandwidth significantly.

Cacheable Accesses:

The advantages of the VSBL# cacheable accesses include:

Memory access latency is reduced: Although consecutive memory accesses can be speculatively loaded into the internal cache (the L0 cache), without the VSBL# being asserted, the internal cache needs to be re-accessed. The VSBL#, when asserted, eliminates the need for re-accessing the internal RAM because the processor will proceed as normal. The use of the VSBL# signal, therefore, reduces the memory access latency.

Internal cache bandwidth is increased: The internal cache does not need to be re-accessed, resulting in higher bandwidth.

Figure 3:
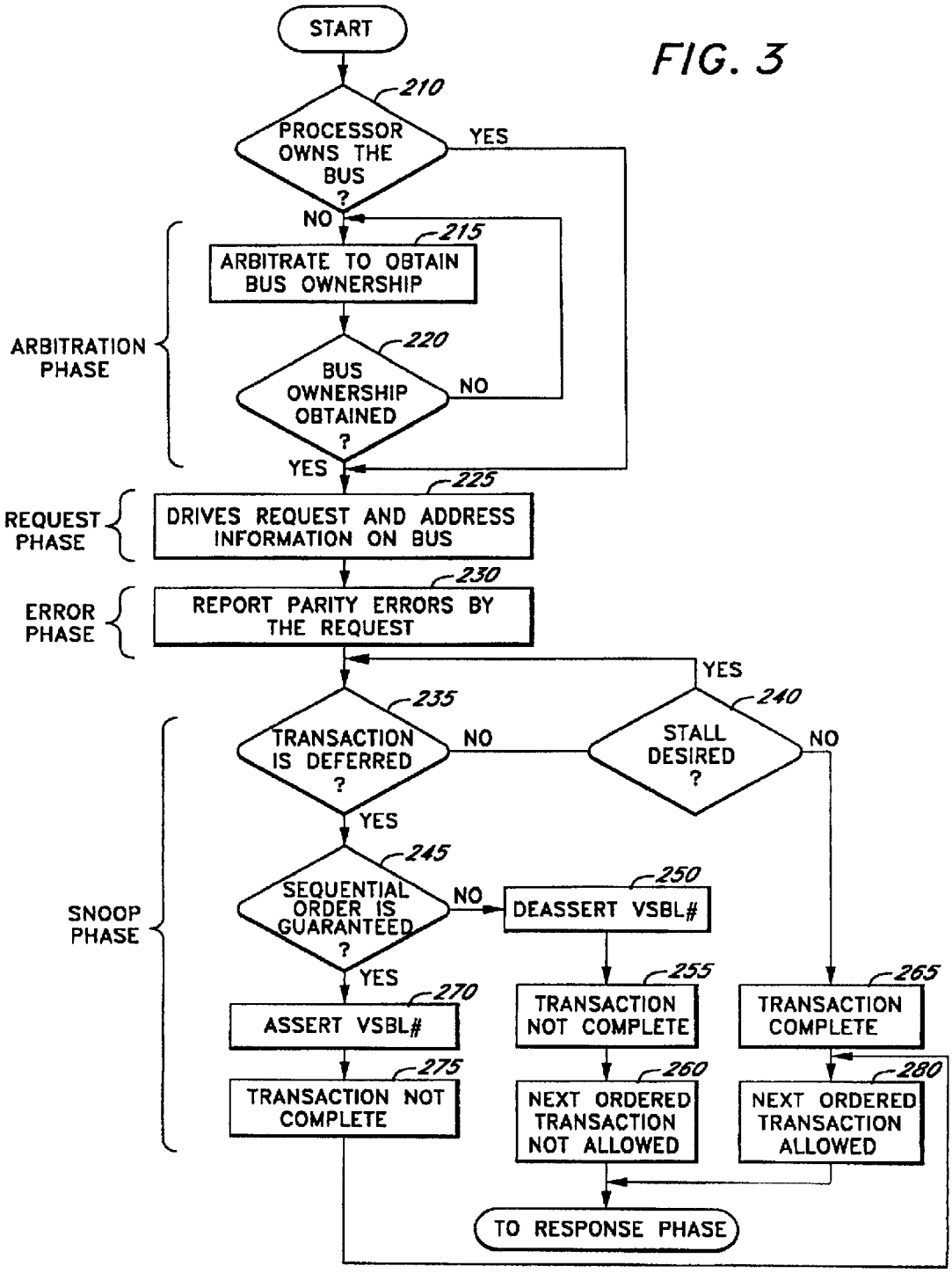
FIG. 3 is a flowchart illustrating the teachings of the present invention.

Referring to FIG. 3, a flowchart illustrating the sequence of operations in various phases is shown. For clarity and in the interest of economy, only Arbitration, Request, Error, and Snoop Phases are described.

At the start, the requesting agent first determines if it owns the bus (Step 210). If the requesting agent does not own the bus, it enters the Arbitration Phase to arbitrate for bus ownership (Step 215). In one embodiment, the arbitration occurs among four symmetric agents, and one priority agent. The symmetric agents arbitrate among themselves with a fair, round-robin scheme. The priority agent overrides any asymmetric agent for request bus ownership.

The requesting agent then determines if it has obtained bus ownership (Step 220) If not, the requesting agent continues the arbitration phase. If it obtains the bus ownership, the requesting agent enters the Request Phase. In the Request Phase, the agent, now becoming the bus owner, drives the request and address information on the bus (Step 225). In one embodiment, the Request Phase is two clocks long. In the first clock, the signal ADS# (Address Strobe) is driven along with transaction address and sufficient information to begin snooping and memory access. The second clock contains the byte enable, identification (ID) information, information about the length of the transaction, and other transaction information.

The agent next enters the Error Phase. In the Error Phase, the agent reports if there are any parity errors by the request (Step 230). In one embodiment, the Error Phase occurs three clocks after the first cycle of the Request Phase. If an error is indicated, the transaction will not have any further phases. If there are no errors, the agent enters the Snoop Phase.

In the Snoop Phase, it is determined if the transaction is deferred (Step 235). If the transaction is not deferred, it is determined if stall is desired (Step 240). If stall is desired (because the agent is slow for example), control returns to step 235. If the transaction is not deferred and stall is not desired, then the transaction is complete (Step 265) and the next ordered transaction is allowed (Step 280). The agent then enters the Response Phase.

If the transaction is deferred, it is determined if sequential order is guaranteed (Step 245). If sequential order is not guaranteed, then the VSBL# signal is deasserted (Step 250), the transaction is not complete (Step 255) and the next ordered transaction is not allowed (Step 260). The agent then enters the Response Phase. If the transaction is deferred and the sequential order is guaranteed, the VSBL# signal is asserted (Step 270). The transaction is not complete (Step 275) because it is deferred but the next ordered transaction is allowed (Step 280). The agent then enters the Response Phase.

Figure 4:
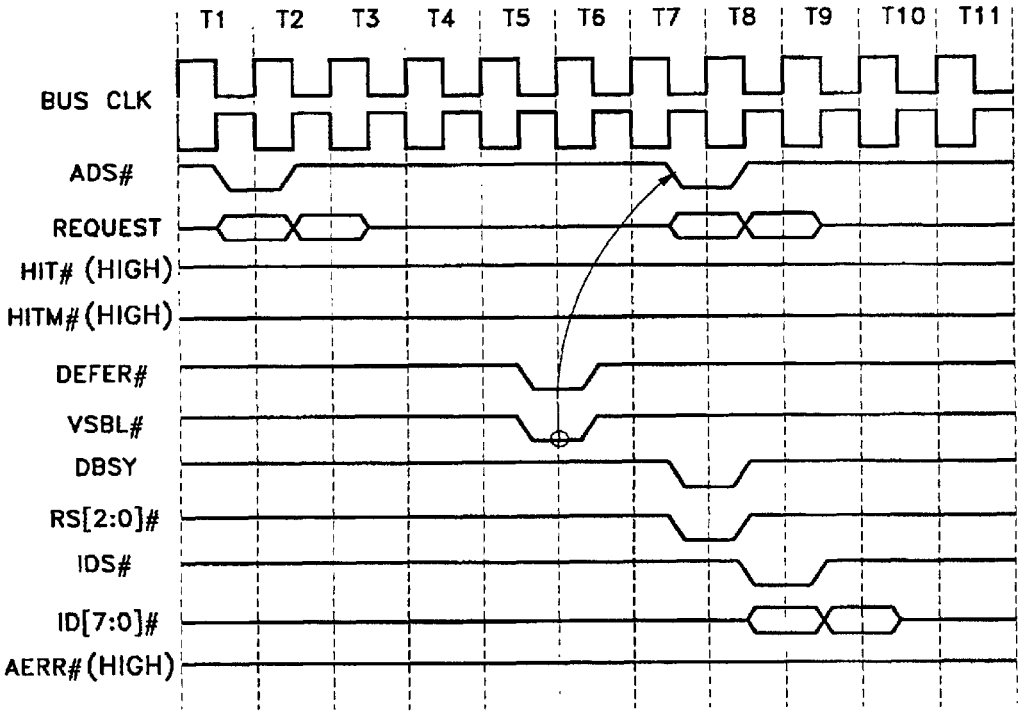
FIG. 4 is a timing diagram illustrating the relationship of the snoop signals and the defer signals.

Referring to FIG. 4, a timing diagram illustrating the relationships of the signals in the Snoop and deferred phases.

AT T1, the agent enters the Request phase by asserting ADS#. In one embodiment, the request information is driven on the bus for two clocks. AERR# is inactive indicating that there is no error in the Error phase. The Snoop phase begins in T5, four clocks after the assertion of ADS#. The transaction cannot be complete in order, so DEFER# is asserted at T5, HIT# and HITM# are de-asserted. The visibility of the deferred transaction is guaranteed, therefore, VSLB# is asserted at the same time when DEFER# asserted to indicate that the next ordered transaction is allowed to proceed.

At T7, the Response phase starts with the assertion of DBSY# and RS[2:0]# is driven. At T8, the IDS# is asserted and the ID[7:0]# is driven on the bus to indicate the beginning of the Deferred phase. The next ordered transaction may begin at T7 although the current transaction is being deferred because VSBL# has been asserted at T5 indicating that visibility is guaranteed.

At T7, the Request phase of the next ordered transaction begins with the assertion of ADS# and request information being driven on the bus.

The visibility indication therefore avoids the delay caused by the waiting time from the deferred phase or deferred response.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for efficient memory access in a computer system that includes an agent coupled to a chipset via a bus, the method comprising:

issuing a first ordered transaction on the bus;

deferring processing of the first ordered transaction;

asserting a visibility signal by the chipset; and issuing a second ordered transaction on the bus responsive to the visibility signal before the first ordered transaction is completed.

2. The method of claim 1, wherein the step of deferring comprises postponing the second ordered transaction if the visibility signal is negated.

3. The method of claim 1 further comprises stalling the first ordered transaction if the first ordered transaction is not ready.

4. The method of claim 1 further comprises accessing a cache line in a cache memory which is coupled to the bus if the cache line is one of the clean, shared, and modified states.

5. The method of claim 3 further comprises postponing the second ordered transaction until the first ordered transaction is complete.

6. The method of claim 4 further comprises completing the first ordered transaction.

7. A system comprising:

a bus;

a chipset coupled to the bus, the chipset being configured to generate a defer signal and a visibility signal; and an agent coupled to the bus and the chipset, wherein the agent is configured to:

(I) issue a first ordered transaction on the bus; (ii) defer processing the first ordered transaction in response to the defer signal; (iii) issue a second ordered transaction on the bus in response to the visibility signal before the first ordered transaction is complete.

8. The system of claim 7 wherein the agent postpones the second ordered transaction if the defer signal is asserted and the visibility signal is negated.

9. The system of claim 7 wherein the agent issues the second transaction if the defer signal is asserted and the visibility signal is asserted.

*10. An apparatus comprising:*

*a chipset to receive a first ordered transaction and to generate a defer signal and a visibility signal indicating when a second ordered transaction can be issued before the first ordered transaction is complete.*

*11. The apparatus of claim 10 further comprising*

*an agent coupled to the chipset, wherein the agent is configured to: issue the first ordered transaction, defer processing the first ordered transaction in response to the defer signal, and issue a second ordered transaction in response to the visibility signal before the first ordered transaction is complete.*

*12. An apparatus comprising:*

*an agent configured to: issue a first ordered transaction, receive a defer signal and a visibility signal, and issue the second ordered transaction in response to the defer signal and the visibility signal before the first ordered transaction is complete.*

*13. The apparatus of claim 12, the agent further configured to:*

*defer processing of the first ordered transaction in response to the defer signal.*

*14. The apparatus of claim 13 further comprising:*

*a chipset to receive the first ordered transaction and to generate the defer signal and the visibility signal.*

*15. The apparatus of claim 11 or claim 13 wherein the agent postpones the second ordered transaction if the defer signal is asserted and the visibility signal is negated.*

*16. The apparatus of claim 11 or claim 13 wherein the agent issues the second transaction if the defer signal is asserted and the visibility signal is asserted.*

*17. A method for processing order-dependent memory access transactions comprising:*

*issuing a first ordered transaction;*

*receiving a defer signal;*

*deferring processing of the first ordered transaction responsive to the defer signal;*

*receiving a visibility signal; and*

*issuing a second ordered transaction responsive to the visibility signal before the first ordered transaction is completed.*

*18. The method of claim 17 further comprising:*

*postponing the second ordered transaction if the visibility signal is negated.*

*19. A method for processing order-dependent memory access transactions comprising:*

*receiving a first ordered transaction;*

*generating a defer signal to defer processing of the first ordered transaction;*

*generating a visibility signal to indicate when a second ordered transaction can be issued before the first ordered transaction is completed; and*

*receiving the second ordered transaction.*

*20. The method of claim 19, the visibility signal being generated also to postpone the second ordered transaction when the visibility signal is negated.*

*21. The method of claim 17 or of claim 19 further comprising:*

*stalling the first ordered transaction if the first ordered transaction is not ready.*

*22. The method of claim 17 or of claim 19 further comprising:*

*accessing a cache line in a cache memory if the cache line is one of the clean, shared, and modified states.*

*23. The method of claim 21 further comprising:*

*postponing the second ordered transaction until the first ordered transaction is complete.*

*24. The method of claim 22 further comprising:*

*completing the first ordered transaction.*

*25. A computer system comprising:*

*a bus interface; and*

*a chipset to receive a first ordered transaction on the bus interface and to generate a defer signal and a visibility signal responsive to receiving the first ordered transaction when a second ordered transaction can be issued before the first ordered transaction is completed.*

*26. The system of claim 25 wherein the defer signal is asserted and the visibility signal is negated to postpone a second ordered transaction.*

*27. The computer system of claim 25 further comprising:*

*an agent coupled to the chipset to: issue the first ordered transaction, defer processing the first ordered transaction in response to the defer signal, and issue the second ordered transaction in response to the visibility signal before the first ordered transaction is complete.*

*28. The system of claim 27 wherein the defer signal is asserted and the visibility signal is asserted to cause the agent to issue the second ordered transaction before the first ordered transaction is complete.*

* * * * *